United States Patent
Kuroyanagi

(12)
(10) Patent No.: US 6,545,767 B1
(45) Date of Patent: Apr. 8, 2003

(54) PRINT SERVER, PRINTING CONTROL METHOD, IMAGE FORMING APPARATUS, IMAGE FORMING METHOD, IMAGE FORMING SYSTEM, AND STORAGE MEDIUM

(75) Inventor: Satoshi Kuroyanagi, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/313,178

(22) Filed: May 18, 1999

(30) Foreign Application Priority Data

May 22, 1998 (JP) .......................................... 10-156854
Apr. 1, 1999 (JP) .......................................... 11-094863

(51) Int. Cl.⁷ ............................................... G06K 15/00
(52) U.S. Cl. ...................................... 358/1.14; 358/1.1
(58) Field of Search ................................ 358/1.1, 1.14, 358/1.18, 1.6, 3.28, 1.13, 526, 462, 470; 382/181, 182, 183, 184, 192, 193, 194

(56) References Cited

U.S. PATENT DOCUMENTS 6,249,226 B1 * 6/2001 Harrison et al. ......... 340/572.1
6,340,931 B1 * 1/2002 Harrison et al. ......... 340/572.1

* cited by examiner

Primary Examiner—Arthur G. Evans
(74) Attorney, Agent, or Firm—Fitzpatrick, Cella, Harper & Scinto

(57) ABSTRACT

An image forming system includes a print server and an image forming apparatus communicating with the print server, the print server including a first storage device for storing an identifier for identifying each user, a first comparator for comparing the identifier included in a print job sent from a client for identifying the client with identifiers stored in the first storage device to determine whether the identical identifier exists, a converter for converting the identifier included in the print job to confidential data unique to each user when the first comparator determines that the identical identifier exists, and an embedding device for embedding the confidential data obtained by converting by the converter in the print job. The image forming apparatus includes a second storage device for storing confidential data unique to each user, a second comparator for comparing confidential data included in the print job received from the printer server stored in the second storage device to determine whether the identical confidential data exists, and an image forming device for forming an image only when the second comparator determines that the identical confidential data exists.

32 Claims, 7 Drawing Sheets

FIG. 5

ID CONVERSION TABLE — 104

| DISTINCTION CODE | GROUP ID | OUTPUT DESTINATION | OUTPUT-DESTINATION PASSWORD | SERVER PASSWORD |
|---|---|---|---|---|
| PC2 | a | Pr1<br>Pr2<br>Pr3<br>Pr4 | a123<br>a456<br>a789<br>Null | abcd |
| PC3 | a | Pr1<br>Pr2<br>Pr3<br>Pr4 | b321<br>b654<br>b987<br>Null | efgh |
| PC4 | Null | Pr1<br>Pr2<br>Pr3<br>Pr4 | c121<br>c454<br>c787<br>Null | ijkl |
| PC5 | b | Pr1<br>Pr2<br>Pr3<br>Pr4 | d323<br>d656<br>d989<br>Null | mnop |
| PC6 | c | Pr1<br>Pr2<br>Pr3<br>Pr4 | e131<br>e464<br>e797<br>Null | qrst |

OUTPUT COUNTER TABLE FOR EACH GROUP — 207

| GROUP ID | USER | OUTPUT-DESTINATION PASSWORD | PRINTING COUNT | COPYING COUNT |
|---|---|---|---|---|
| a | PC2<br>PC3 | a456<br>b654 | 1185<br>0421 | 3855 |
| Null | PC4 | c454 | 1351 | 8929 |
| b | PC5 | d656 | 3657 | 5164 |
| c | PC6 | e464 | 0218 | 0908 |

COUNTER TABLE — 104b

| DISTINCTION CODE | GROUP ID | OUTPUT DESTINATION | PRINTING COUNT | COPYING COUNT |
|---|---|---|---|---|
| PC2 | a | Pr1<br>Pr2<br>Pr3<br>Pr4 | 2345<br>1185<br>0375<br>1677 | 6313<br>3855<br>4227<br>Null |
| PC3 | a | Pr1<br>Pr2<br>Pr3<br>Pr4 | 2758<br>0421<br>0324<br>3512 | |
| PC4 | Null | Pr1<br>Pr2<br>Pr3<br>Pr4 | 5103<br>1351<br>2864<br>0951 | 8929<br>1929<br>3766<br>Null |
| PC5 | b | Pr1<br>Pr2<br>Pr3<br>Pr4 | 1732<br>3657<br>1839<br>1224 | 4441<br>5164<br>2677<br>Null |
| PC6 | c | Pr1<br>Pr2<br>Pr3<br>Pr4 | 4531<br>0218<br>4536<br>2055 | 5413<br>0908<br>6552<br>Null |

701   702   703   704   705

PRINT SERVER, PRINTING CONTROL METHOD, IMAGE FORMING APPARATUS, IMAGE FORMING METHOD, IMAGE FORMING SYSTEM, AND STORAGE MEDIUM

BACKGROUND OF THE INVENTION

1. Field of the Invention

The present invention relates to a print server for transmitting a printing job sent from a client connected to a network to an image output apparatus, a printing control method for the print server, an image forming apparatus which use is restricted by confidential data, an image forming method therefor, an image forming system comprised of the above, and a storage medium for storing a control program for controlling the image forming system.

2. Description of the Related Art

Some copying machines have a confidential-code-number mode function in which copying is allowed only when a confidential code number input from an operation panel matches the confidential code number registered in advance. With such a confidential-code-number mode function, copying can be disabled for those who are not registered.

In addition, the number of actually copied sheets can be counted for each confidential code number. By this counted number, the number of copies the user has made for each confidential code number is obtained and can be used for imposing the use fee of the copying machine.

Recent versatile digital office machines connected to a network can be used as printers. To allow copies to be made in a confidential-code-number mode function as in copying machines or to allow the number of copies to be counted for each confidential code number in the versatile digital office machines, it is necessary for the user to go to a place where a versatile digital office machine is installed and input a confidential code number at an operation section of the versatile digital office machine to release a confidential-code-number input state. It is possible that a confidential code number is included in printing data and an output apparatus analyzes the code number according to the data to perform the same procedure as that implemented by inputting the code number at an operation section. In this case, however, the user needs to specify different confidential code numbers for a plurality of output apparatuses. If the output apparatus used is changed, the confidential code number needs to be specified again, which is troublesome for the user.

SUMMARY OF THE INVENTION

Accordingly, it is a first object of the present invention to provide an image forming method, an image forming system, and a storage medium storing a control program which allow printing to be instructed without inserting confidential data for a printing apparatus into a job.

A second object is to provide an image forming method, an image forming system, and a storage medium storing a control program which allow counting management to be smoothly controlled in the image forming system of the present invention described above.

One of the foregoing objects is achieved in one aspect of the present invention through the provision of a print server including: management means for managing identification data for identifying each user; determination means for determining whether the management means manages identification data for identifying a client, included in a printing job sent from the client; and embedding means for embedding confidential data required to use an image output apparatus in the printing job when the determination means determines that the management means manages the identification data included in the printing job.

One of the foregoing objects is achieved in another aspect of the present invention through the provision of an image forming apparatus for controlling an image output according to a printing job sent from a client, in which a print server embeds confidential data, including: determination means for determining whether the printing job received from the print server includes confidential data; image forming means for controlling image formation according to the printing job when the determination means determines that confidential data is embedded in the printing job; counting means for counting the number of discharged sheets correspondingly to the confidential data when a recording medium in which an image is formed and recorded is successfully discharged; and output means for outputting the count information corresponding to the confidential data, counted by the counting means to the print server.

One of the foregoing objects is achieved in yet another aspect of the present invention through the provision of an image forming system including an upper apparatus and an image forming apparatus communicating with the upper apparatus, the upper apparatus including: first storage means for storing an identifier for identifying each user; first comparison means for comparing the identifier included in a printing job sent from a client for identifying the client with identifiers stored in the first storage means to determine whether the identical identifier exists; conversion means for converting the identifier included in the printing job to confidential data unique to each user when the first comparison means determines that the identical identifier exists; and embedding means for embedding the confidential data obtained by converting by the conversion means in the printing job, and the image forming apparatus including: second storage means for storing confidential data unique to each user; second comparison means for comparing confidential data included in the printing job with the confidential data stored in the second storage means to determine whether the identical confidential data exists; and image forming means for forming an image only when the second comparison means determines that the identical confidential data exists.

BRIEF DESCRIPTION OF THE DRAWINGS

FIG. 5 is a view showing details of an ID conversion table in a print server according to the present invention.

FIG. 6 is a view showing details of a counter table for each group in an image input and output apparatus according to the present invention.

FIG. 7 is a view showing details of a counter table in the print server according to the present invention.

DESCRIPTION OF THE PREFERRED EMBODIMENT

Figure 1:
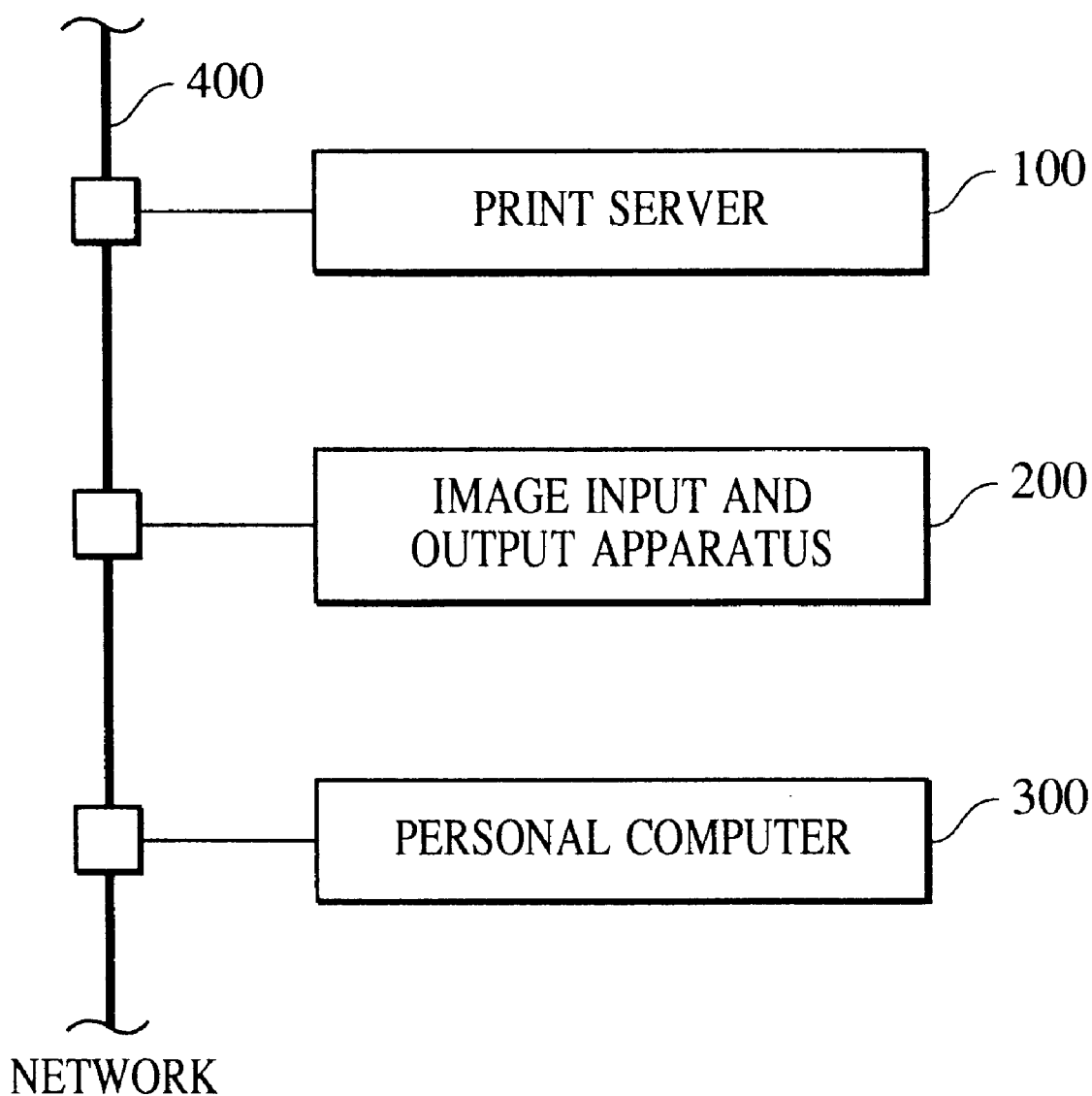
FIG. 1 is a block diagram showing an overall view of a networked image forming system according to an embodiment of the present invention.

An embodiment of the present invention will be described below by referring to the drawings.

FIG. 1 is a block diagram showing an overall view of a networked image forming system according to an embodiment of the present invention.

In FIG. 1, a print server 100, an image input and output apparatus, such as a networked printer 200, and a personal computer (a client) 300 are connected to a network 400 to form a network system.

Figure 2:
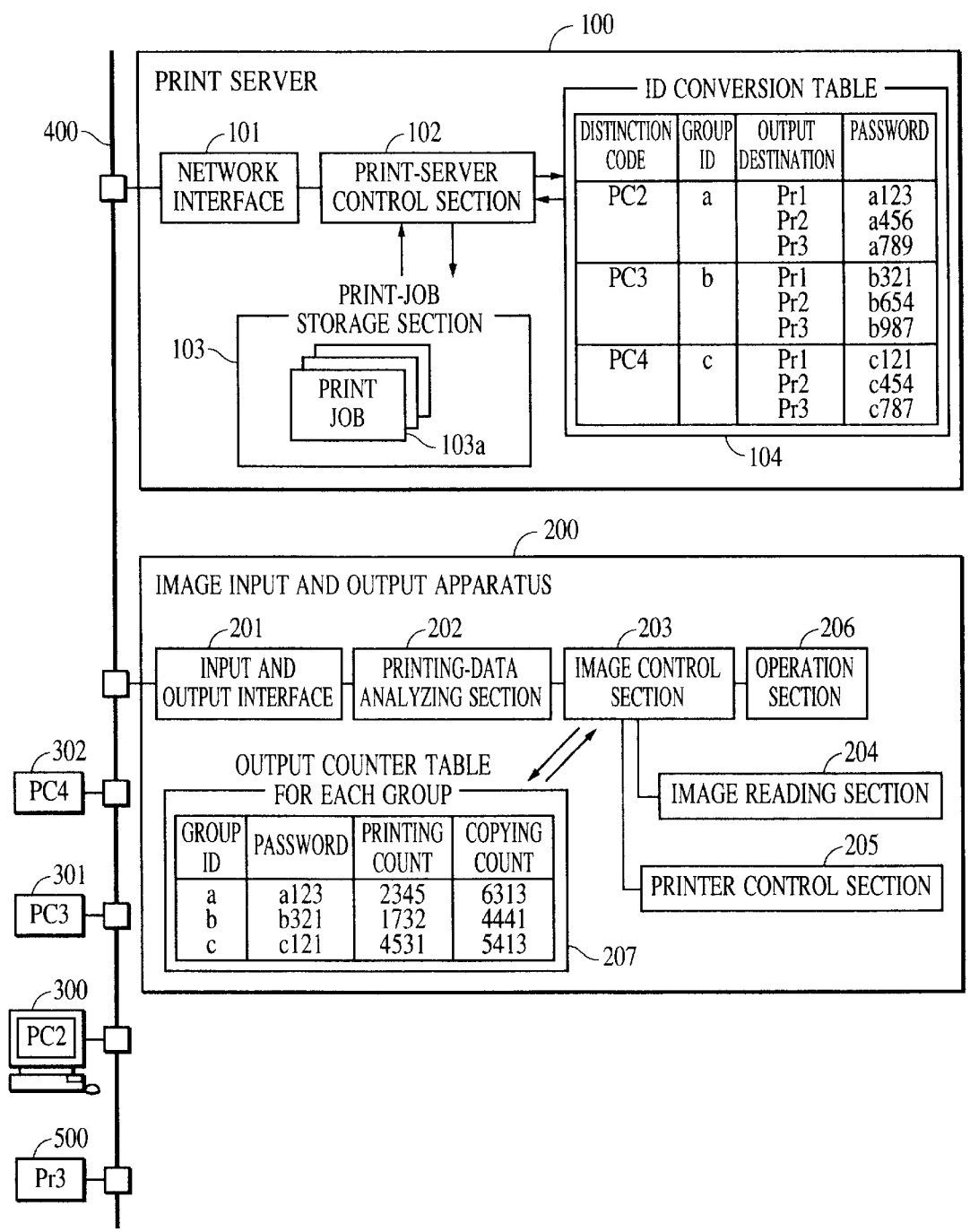
FIG. 2 is a block diagram showing a detailed structure of the image forming system according to the embodiment of the present invention.

FIG. 2 is a block diagram showing a detailed structure of the image forming system shown in FIG. 1.

In FIG. 2, the print server 100, which serves as a printing management apparatus, includes a network interface 101, a print-server control section 102, a printing-job storage section 103, and an ID conversion table 104.

The network interface 101 is connected to the network 400. The network interface 101 receives data from the network 400 to pass it to the print-server control section 102, and transmits to the network 400 data sent from the print-server control section 102 to pass the data to other units connected to the network 400.

The print-server control section 102 receives a printing job 103a output from the personal computer 300 through the network interface 101, and stores it in the printing-job storage section 103. As described later, to maintain server security, the print-server control section 102 checks whether a password for the server specified in advance is included in the printing job 103a. Only when the password for the server is included, the printing job 103a is stored in the printing-job storage section 103. Then, the print-server control section 102 sequentially outputs data to the image input and output apparatus 200 and other units according to printing destination data and output priority data included in the printing job 103a. The ID conversion table 104 is a database for which reading and writing data can be performed by the print-server control section 102. The ID conversion table 104 includes a distinction code for each personal computer registered as a client and an identifier (ID) for each group registered for each distinction code. In the ID conversion table 104 shown in FIG. 2, a distinction code PC2 is included only in printing data sent from a personal computer PC2 serving as a client. As a distinction code, an IP address specified for each unit connected to the network 400 can be used.

FIG. 5 is a view showing more details of the ID conversion table 104 shown in FIG. 2. In FIG. 5, a distinction code 501 is used for identifying the client (personal computer) which sends printing data and is compared with the identification code of a client included in printing data. A group ID 502 indicates information of a group for which the image input and output apparatus performs counting, and also serves as a kind of password. In a recent system, however, since one image input and output apparatus is shared by a plurality of users and many group IDs are used, use permission is accidentally granted in some cases by inputting a code as a group ID. To avoid these cases, a group ID is just used for identifying a group for which counting is performed and an output-destination password is further provided. This output-destination password 504 is assigned to each client in the present embodiment. A PC2 user has a group ID of "a" and needs a password of "a123" to output data at a printer 1 (Pr1). In the system according to the present invention, to eliminate troublesome work of memorizing all output-destination passwords at a client side, a server password is provided, and with a correct input of the server password, the print server attaches the output-destination password of each output destination. The client embeds the server password 505 into printing data and sends it to the print server, the print server checks the password, and when the password is correct, the print server automatically attaches the appropriate output-destination password. Therefore, even for an image input and output apparatus which requires a password to be input at each use, since the print server automatically attaches an output password, the client uses the system more easily.

The print-server control section 102 analyzes the data of the sent printing job 103a, and checks an identification-code (identifier) registration part in the data. When the print-server control section 102 determines that the data of the printing job 103a includes an identification code of PC2, for example, the print-server control section 102 searches the distinction code column of the ID conversion table 104 for the identification code PC2. When the code is found, the print-server control section determines that the code has already been registered and continues printing. Since the identification code PC2 corresponds to a group ID of "a," the group ID "a" is converted and embedded as the group-ID data of the printing job 103a, and the data is sent to the output destination, the image input and output apparatus 200. In the ID conversion table 104 shown in FIG. 2, group IDs "a," "b," and "c" are registered for personal computers PC2, PC3, and PC4, respectively. When the users of PC2 and PC3 belong to the same group, the group IDs corresponding to PC2 and PC3 can be set to "a" to allow a plurality of users to be collectively managed. In addition, when an output destination Pr3 does not check a group ID, processing for converting and embedding an identification code as a group ID is not necessarily required.

In FIG. 2, the image input and output apparatus 200 includes an input and output interface 201, a printing-data analyzing section 202, an image control section 203, an image reading section 204, a printer control section 204, an operation section 206, and an output counter table 207 for each group. The image input and output apparatus 200 corresponds to a laser beam printer or an ink-jet printer, for example, and further corresponds to a versatile office machine provided with a remote printing function (also with a copying function and a facsimile function).

The input and output interface 201 is connected to the network 400. The interface 201 receives printing data sent from the print server 100 through the network 400, and sends back the printing output state of the image input and output apparatus 200 to the print server 100.

The printing-data analyzing section 202 analyzes printing data output from the personal computer 300 and received through the print server 100, and converts it to a data format which can be printed at the printer control section 205. When the data is converted to the data format which can be printed at the printer control section 205, the converted data is sent to the image control section 203.

The image control section 203 receives image data from the printing-data analyzing section 202 or the image reading section 204, sends the image data to the printer control section 205, and controls the printer control section 205 such that the data is printed. The image control section 203 also references the output counter table 207 for each group, which is a database, and updates the data thereof.

The image reading section 204 is connected to the image control section 203, scans the original to read it by reading means such as a charge coupled device (CCD), converts it to image data, and sends the image data to the image control section 203. The image reading section 204 starts operating according to an instruction sent from the image control section 203.

The printer control section 205 is connected to the image control section 203, and prints image data received from the image control section 203. In the present embodiment, two types of modes, a color printing output mode and a monochrome printing output mode, are available. According to an instruction sent from the image control section 203, the printing output mode is switched between the color mode and the monochrome mode.

The operation section 206 is connected to the image control section 203, and monitors the operation state of the image control section 203. The operation state is indicated on a display part (not shown) of the operation section. With the use of the input part of the operation section 206, an operation mode, an operation start, and an operation stop can be specified for the image control section 203. For example, a series of operations formed of reading the original by the image reading section 204, receiving the read image data by the image control section 203, and sending the image data to the printer control section 205 to form an image is instructed. These operations can be performed only by the image input and output apparatus 200 without any interaction with the network. In other words, a copying operation is independently possible in the image input and output apparatus 200.

The output counter table 207 for each group is a database for which reading and writing are possible from the image control section 203. In the output counter table 207, the ID and output count data of each group currently registered are stored. In the output counter table 207 shown in FIG. 2, a group having a group ID of "a" has an output count of 2345. To register a group ID in the output counter table 207, data is input from the input part of the operation section 206 and the data of the output counter table 207 is updated through the image control section 203. The data of the output counter table 207 can be sent to the print server 100 through the image control section 203, the printing-data analyzing section 202, and the input and output interface 201 and further via the network 400. Count data can be tallied for each group by collecting all of printing data.

In FIG. 2, the personal computer (PC2) 300, a personal computer (PC3) 301, a personal computer (PC4) 302, and a printer (Pr3) 500 are connected to the network 400. Many other personal computers and printers are further connected to the network 400 although they are not shown.

Different procedures for referencing the output counter table 207 are used for copying and printing.

Control for copying, which is local printing, will be described first.

When group IDs have already been registered in the output counter table 207, unless any of the group IDs registered in the output counter table 207 is input from the operation section 206, the image control section 203 does not receive a copying operation instruction. When a group ID is not registered, a copying operation is accepted even if a group ID is not input. When a copying operation is achieved without inputting a group ID, however, a common count is used with a group ID being set to Null.

When a group ID registered in the output counter table 207 is input to the operation section 206, receipt of an copying operation instruction is enabled. During a copying operation, since the printer control section 205 reports the number of discharged sheets, the image control section 203 updates the corresponding value of the output counter table 207. When the ID "a" is input to the operation section 206, the operation section 206 sends the data having the ID "a" to the image control section 203. The image control section 203 searches the group ID column in the output counter table 207 for the ID "a." When the ID "a" is detected and it is determined that the ID "a" has been registered, the image control section 203 sends the condition to the operation section 206, and enables a copying operation instruction sent from the operation section 206 to be received. When a copying operation is performed after that, the image control section 203 increases the copying count corresponding to the ID "a" in the output counter table 207 by the number sent from the printer control section 205. In the present embodiment, symbols such as "a" and "b" are used for group IDs. In general, four characters formed of a combination of numerals and the alphabetical letter in the password of each group are actually used.

FIG. 6 is a view showing details of the output counter table 207 for each group shown in FIG. 2. In FIG. 6, a group ID 601 serves as an identification code for managing the group as described above. A user 602 indicates an owner for remote printing. The user will be described later in printing processing. An output-destination password 603 is required when the user uses the image input and output apparatus for remote printing. A printing count 604 indicates the count for remote printing from a client. The printing count can be indicated for each user, and is uploaded to the print server 100 as described later. A copying count 605 indicates the count for copying, which is local printing. The copying count can be indicated for each group and is uploaded to the print server 100 as described later.

Control for remote printing will be described next.

Printing data is output from the personal computer (PC2) 300 and sent to the print server 100. The print server 100 determines a printing output destination and a printing sequence and sends the data to the image input and output apparatus 200.

When a group ID has been already registered in the output counter table 207 for each group, the image control section 203 checks whether a group ID is embedded in the printing data. If the embedded group ID does not match a group ID registered in the output counter table 207, the image control section 203 does not perform printing operation processing.

When the image control section 203 determines that the group ID included in the printing data matches any of group IDs registered in the output counter table 207, the image control section 203 receives an printing operation start instruction. Since the printer control section 205 sends the number of sheets discharged during the printing operation, the image control section 203 updates the corresponding value of the output counter table 207 by that number. When the ID "b" is included in the printing data, for example, the image control section 203 searches the group ID column in the output counter table 207 for the ID "b." When the ID "b" is detected, it is determined that the ID "b" has been registered, and the image control section 203 enables a printing output to be received. When a printing operation is performed after that, the image control section 203 increases the output count corresponding to the ID "b" in the output counter table 207 by the number sent from the printer control section 205.

Operations of the image forming system according to the present invention will be described next by referring to FIG. 3 and FIG. 4.

Figure 3:
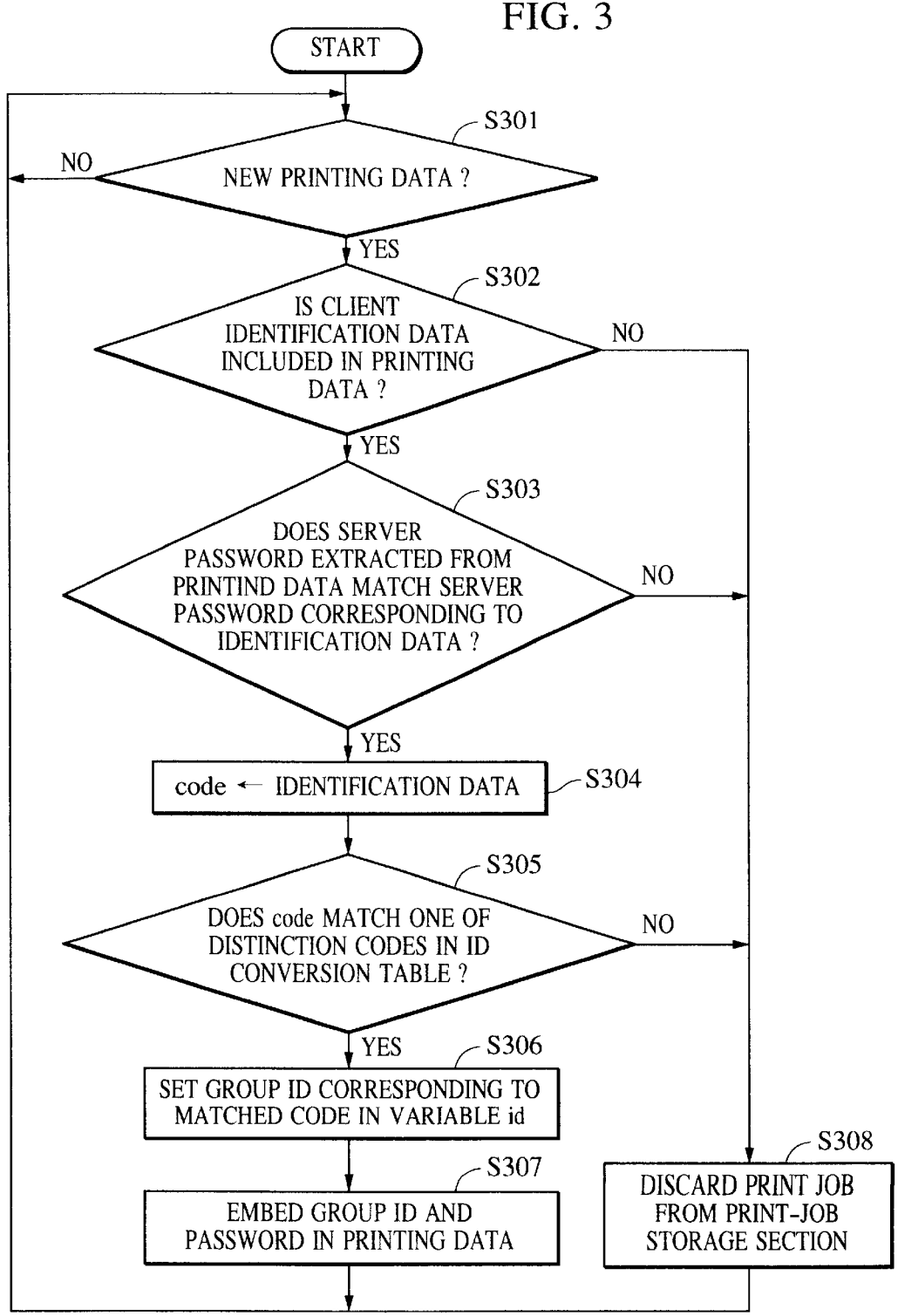
FIG. 3 is a flowchart showing a processing procedure of a print-server control section in the image forming system according to the embodiment of the present invention.
Figure 4:
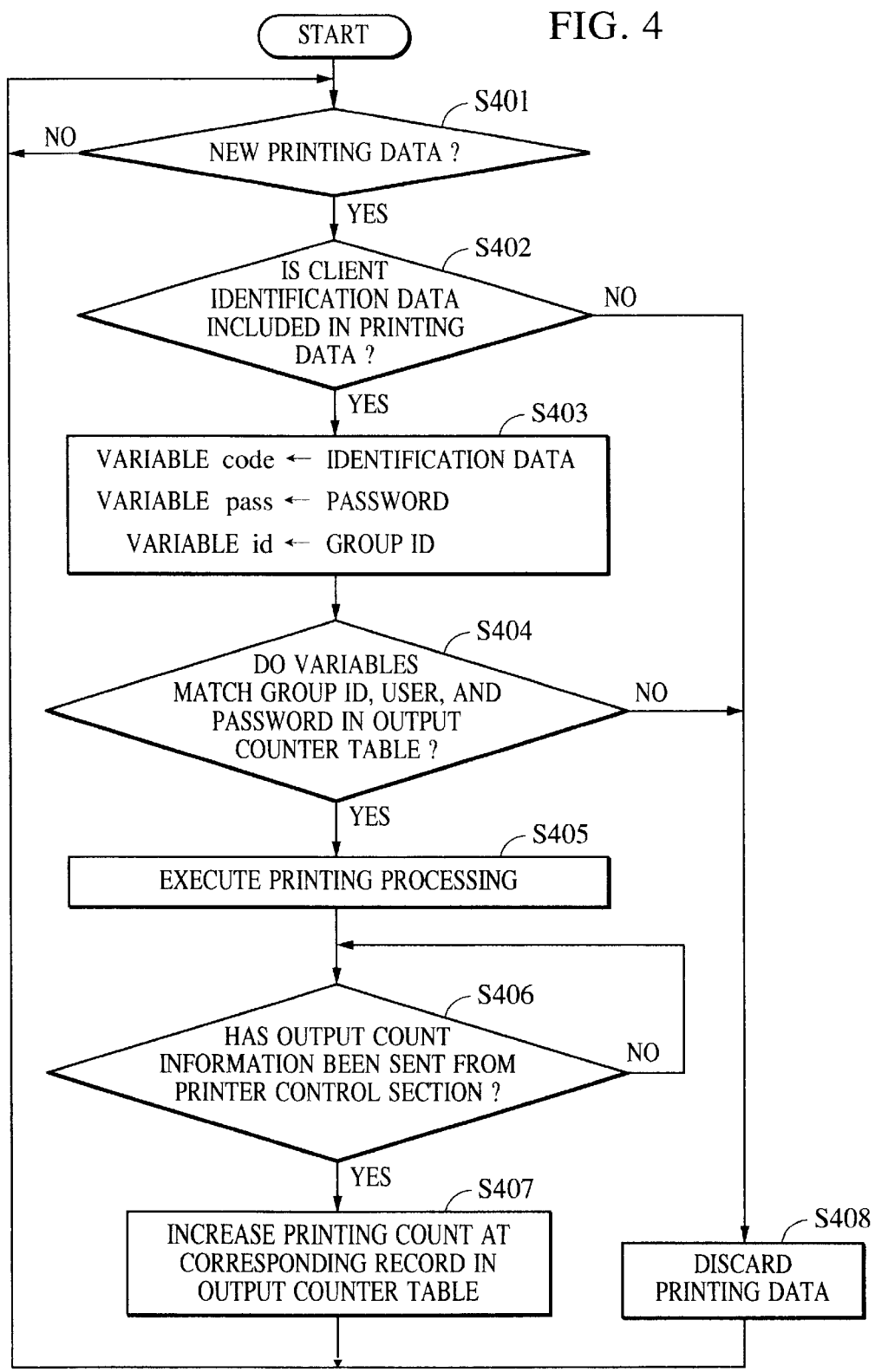
FIG. 4 is a flowchart showing a processing procedure of an image control section in the image forming system according to the embodiment of the present invention.

FIG. 3 is a flowchart showing the processing procedure of the print-server control section 102, and FIG. 4 is a flowchart showing the processing procedure of the image control section 203.

The processing procedure performed in the print-server control section 102 will be described first by referring to FIG. 3.

In a step S301, the print-server control section 102 determines whether new printing data has been sent to the print server 100 through the network interface 101, until it has been sent. When new printing data has been sent, the print-server control section 102 determines in the next step S302 whether the printing data includes an identification data indicating the client which has sent the printing data. The identification data refers to a distinction code for each personal computer registered as a client, as described above. It may be an IP address, the machine name of a client PC, or information separately attached by a printer driver. When it is determined in the step S302 that the identification data is included, the print-server control section 102 extracts a server password from the printing data and determines whether the identification data corresponds to the server password with the use of the ID conversion table shown in FIG. 5. When it is determined that the identification data of the client corresponds to the server password, the procedure proceeds to a step S304. When it is determined that the identification data does not correspond to the server password, the procedure proceeds to a step S308. In the present embodiment, a server password is attached by a printer driver of a client, such as the client PC2. A server password is specified for each client. It is a matter of course that the password may be set for each group. In terms of operations, count management in remote printing can be performed for each client by setting a server password for each client as in the present embodiment.

When the identification data corresponds to the server password, the print-server control section 102 extracts the identification data from the printing data and stores it in a temporary variable "code" for search with the use of the ID conversion table 104 in the step S304.

In the next step S305, the print-server control section 102 searches the distinction code column in the ID conversion table, which is a database, for the code stored in the variable "code," and determines whether the matched code exists. When the print-server control section 102 determines that the code stored in the variable "code" matches any of identification codes, in other words, when it is determined that the identification code indicating the client which has sent the printing data has already been registered in the distinction code column of the ID conversion table 104, the print-server control section 102 stores the group ID corresponding to the matched identification code for which the distinction code and the output-destination printer correspond, into a variable "id" temporary used in the print server 100 in the next step S306. In the next step S307, the print server 102 embeds the value of the temporary variable "id" and the password corresponding to the distinction code in the printing data currently being processed. The procedure returns to the step S301, and new printing data is awaited in the same way.

As shown by Pr4 in FIG. 5, there is an image input and output apparatus for which an output-destination password is not registered. In such a case, only a group ID is embedded in the step S307. In other words, the identification code of the client, the group ID, and printing data to be actually printed are transmitted in a printing job. In an image input and output apparatus which does not require an output-destination password, such as Pr4, there is no restriction on use and remote printing can be performed without lock. Since the identification code and the group ID of a client are sent together in a printing job, count management is allowed.

When the printing data does not include the identification data indicating the client which has sent the data in the step S302, when the identification data included in the printing data does not correspond to the server password in the step S303, and when the code stored in the variable "code" does not exist in the distinction codes of the ID conversion table, the procedure proceeds to a step S308. Since printing-output permission is not given to the client which has output the printing data, the printing data is discarded from the printing-job storage section 103, the procedure returns to the step S301, and new printing data is awaited in the same way.

As described later with FIG. 4, a printing count and a copying count are managed in the image input and output apparatus. In order that the print server collectively manages counts in all image input and output apparatuses on the network, the print server 100 obtains the count information of the counter tables from all the image input and output apparatuses 200 connected to the network at certain timing. The timing can be changed in operations. A count request command is broadcasted at a predetermined time or at an interval of a predetermined period, and the replies are received to form a unified counter table shown in FIG. 7.

In FIG. 7, a distinction code 701 is the same information as the code 501 in FIG. 5, and indicates the client. A group ID 702 indicates the group. It is found that clients PC2 and PC3 belong to the same group "a." A client PC4 has no group setting and the counts thereof are measured as an individual. An output destination 703 is specified in the present embodiment for each of image input and output apparatuses Pr1 to Pr4, for which count information is managed. A printing count 704 is managed for each client and is further recorded for each output destination. The printing count refers to the number of discharged sheets in remote printing processing, which is sent as printing data from the client. In the present embodiment, since count information measured by image input and output apparatuses in remote printing is sent to the print server and collectively managed, it is easily determined who (which client) outputs how many sheets at each output-destination image input and output apparatus. As described above, in the present embodiment, since the print server does not analyze printing data in advance for counting, counting is not performed for a printing job which an image input and output apparatus cancels. Only the number of actually discharged sheets is counted, allowing correct count management. A copying count 705 indicates the number of discharged sheets in copying processing, which is local printing, in an image input and output apparatus. In the present embodiment, the copying count is managed for each group. As shown in FIG. 5, since the output destination Pr4 does not have an output-destination password, copying processing is not locked and can be used at any time. Therefore, the copying count thereof cannot be managed for each group or each client, but can be managed as the total number, and is set to "Null."

A processing procedure performed by the image control section 203 in an image input and output apparatus which requires authentication will be described next by referring to FIG. 4. In other words, it is the processing to be performed in Pr1 to Pr3 in the present embodiment. Password authentication is not necessary for Pr4. Since Pr4 is a non-locked printer, the processing shown in FIG. 4 is not performed.

In a step S401, the image control section 203 determines whether new printing data has been sent through the input and output interface 201 and the printing-data analyzing section 202 until it has been sent. When new printing data has been sent, the image control section 203 determines in the next step S402 whether the identification data, the output-destination password, and the group ID of the client are included in the new printing data. When they are included, the image control section 203 extracts the included identification data, the output-destination password, and the group ID and stores them in temporary variables "code," "pass," and "id" for search, respectively, in the next step S403.

In the next step S404, the image control section 203 searches the output counter table 207 for each group, which is a database, for the identification data, the output-destination password, and the group ID stored in the variables "code," "pass," and "id," to check matching. When the codes stored in the variables "code," "pass," and "id" match the identification data, the output-destination password, and the group ID of a user, which constitute a record, since the received printing data is authenticated as printing data sent from a client for whom printing output is allowed, the image control section 203 recognizes printing permission, and issues a printing output start instruction to the printer control section 205 to perform printing output processing in the next step S405. In the next step S406, the image control section 203 determines whether output count information, which is the number of discharged sheets in printing, has been sent from the printer control section 205 until it has been sent. When the output count information has been sent, the image control section 203 increases the printing count of a record in which the group ID matches the variable "id" and the identification data matches the variable "code," by the output count data in the next step S407. Then, the procedure returns to the step S401, and new printing data is awaited in the same way.

When the identification data indicating a client which has sent the printing data is not included in the printing data in the step S402, and when a group ID, a user, and an output-destination password in the output counter table 207 for each group, which is a database, do not match the identification data and the password stored in the variables "id," "code," and "pass" in the step S404, the procedure proceeds to a step S408. It is determined that printing output permission is not granted for the client which has output the printing data, and the printing data is discarded. The procedure then returns to the step S401, and the wait for new printing data is performed in the same way.

As described above, the counter table shown in FIG. 6 is formed in the image input and output apparatus 200. The counts in the counter table generated in this way are requested by the print server at the predetermined timing as described above. According to a request instruction, each count is sent to the print server.

The processing shown in the above embodiment is mainly handled by the print server or the CPU, which serves as the control section of the image input and output apparatus. The control program thereof can be stored in an external memory card. In other words, it is a matter of course that a storage medium for storing program codes that implement the functions described in the above embodiment is supplied to a system or an apparatus, and a computer (CPU or MPU) of the system or the apparatus reads and executes the program codes stored in the storage medium to implement the functions.

In this case, since the program codes themselves read from the storage medium implement the functions described in the above embodiment, the storage medium for storing the program codes constitutes the present invention.

Storage media for supplying the program codes include floppy disks, hard disks, optical disks, magneto-optical disks, CD-ROMs, CD-Rs, magnetic tape, non-volatile memory cards, ROMs, and DVDs.

The computer executes the read program codes to implement the functions of the above embodiment. Alternatively, according to instructions of the program codes, an operating system (OS) running on the computer may perform a part or the whole of actual processing to implement the functions described in the above embodiment.

It is a matter of course that the present invention may include a system in which program codes read from a storage medium are written into a memory provided for a function extension board inserted into the computer or a function extension unit connected to the computer, and according to instructions of the program codes, the CPU provided for the function extension board or the function extension unit executes a part or the whole of actual processing to implement the functions described in the above embodiment.

As described above in detail, according to an image forming method and an image forming system of the present invention, the output specified by the user to whom output permission is not given can be restricted, and an administrator can change the database of the server to collectively disable outputs at all output apparatuses without individually disabling an output at each output apparatus. In addition, since the server converts to a confidential code number for each output apparatus, the user does not need to specify the code number for each output apparatus.

According to a storage medium of the present invention, an image forming system according to the present invention, described above, can be smoothly controlled.

What is claimed is:

1. A print server comprising:
    management means for managing identification data for identifying each user;
    determination means for determining whether said management means manages identification data for identifying a client, included in a print job sent from the client; and
    embedding means for embedding confidential data required to use an image output apparatus in the print job when said determination means determines that said management means manages the identification data included in the printing job.

2. A print server according to claim 1, wherein said management means manages the confidential data together with the corresponding identification data as a pair.

3. A print server according to claim 1, wherein the confidential data includes a group ID for identifying a group formed of a plurality of clients as a set and a password specified for each client for permitting the use of the image output apparatus.

4. A print server according to claim 1, further comprising discarding means for discarding the print job when said determination means determines that said management means does not manage the identification data included in the printing job.

5. A print server according to claim 1, further comprising obtaining means for obtaining output count information from the image output apparatus at a predetermined timing, wherein output count information obtained from a plurality of image output apparatuses by said obtaining means is collectively managed.

6. A print server according to claim 5, wherein the predetermined timing is a preset time.

7. A print server according to claim 5, wherein the predetermined timing is a predetermined time interval.

8. A print server according to claim 1, further comprising transmitting means for transmitting the print job in which said embedding means embeds the confidential data to an output-destination image output apparatus.

9. A printing control method for controlling a print server having management means for managing identification data for identifying each user, comprising;
   a determination step for determining whether said management means manages identification data for identifying a client, included in a print job sent from the client; and
   an embedding step for embedding confidential data required to use an image output apparatus in the print job when it is determined in said determination step that the management means manages the identification data included in the print job.

10. A printing control method according to claim 9, wherein the management means manages the confidential data together with the corresponding identification data as a pair.

11. A printing control method according to claim 9, wherein the confidential data includes a group ID for identifying a group formed of a plurality of clients as a set and a password specified for each client for permitting the use of the image output apparatus.

12. A printing control method according to claim 9, further comprising a discarding step for discarding the print job when it is determined in said determination step that the management means does not manage the identification data included in the print job.

13. A printing control method according to claim 9, further comprising an obtaining step for obtaining output count information from the image output apparatus at a predetermined timing, wherein output count information obtained from a plurality of image output apparatuses in said obtaining step is collectively managed.

14. A printing control method according to claim 13, wherein the predetermined timing is a preset time.

15. A printing control method according to claim 13, wherein the predetermined timing is a predetermined time interval.

16. A printing control method according to claim 9, further comprising a transmitting step for transmitting the print job in which the confidential data is embedded in said embedding step to an output-destination image output apparatus.

17. An image forming apparatus for controlling an image output according to a printing job sent from a client, in which a print server embeds confidential data, comprising:
   determination means for determining whether the print job received from the print server includes confidential data;
   image forming means for controlling image formation according to the print job when said determination means determines that confidential data is embedded in the print job;
   counting means for counting the number of discharged sheets correspondingly to the confidential data when a recording medium in which an image is formed and recorded is successfully discharged; and
   output means for outputting the count information corresponding to the confidential data, counted by said counting means to the print server.

18. An image forming apparatus according to claim 17, further comprising image reading means for reading an image from the original, wherein said image forming means forms an output image according to the image read from the original by said image reading means.

19. An image forming apparatus according to claim 18, wherein said counting means counts as a copying count when an image is formed according to the image read by said image reading means, and said counting means counts as a printing count when an image is formed according to the print job received from the print server.

20. An image forming apparatus according to claim 19, wherein the confidential data includes a group ID for identifying a group formed of a plurality of clients as a set, and a password specified for each client for permitting the use of the image output apparatus, the copying count is measured for each group and the printing count is measured for each client.

21. An image forming apparatus according to claim 17, further comprising discarding means for discarding the print job when said determination means determines that the print job does not include confidential data.

22. An image forming method for controlling an image forming apparatus for controlling an image output according to a printing job sent from a client, in which a print server embeds confidential data, comprising:
   a determination step for determining whether the print job received from the print server includes confidential data;
   an image forming step for controlling image formation according to the print job when it is determined in said determination step that confidential data is embedded in the printing job;
   a counting step for counting the number of discharged sheets correspondingly to the confidential data when a recording medium in which an image is formed and recorded is successfully discharged; and
   an output step for outputting the count information corresponding to the confidential data, counted in said counting step to the print server.

23. An image forming method according to claim 22, further comprising an image reading step for reading an image from the original, wherein an output image is formed in said image forming step according to the image read from the original in said image reading step.

24. An image forming method according to claim 23, wherein, in said counting step, counting is performed as a copying count when an image is formed according to the image read in said image reading step, and counting is performed as a printing count when an image is formed according to the print job received from the print server.

25. An image forming method according to claim 24, wherein the confidential data includes a group ID for identifying a group formed of a plurality of clients as a set, and a password specified for each client for permitting the use of the image output apparatus, the copying count is measured for each group and the printing count is measured for each client.

26. An image forming method according to claim 22, further comprising a discarding step for discarding the print job when it is determined in said determination step that the print job does not include confidential data.

27. An image forming system comprising
   a print server and
   an image forming apparatus communicating with said print server, said print server comprising:

first storage means for storing an identifier for identifying each user;

first comparison means for comparing the identifier included in a print job sent from a client for identifying the client with identifiers stored in said first storage means to determine whether the identical identifier exists;

conversion means for converting the identifier included in the print job to confidential data unique to each user when said first comparison means determines that the identical identifier exists; and embedding means for embedding the confidential data obtained by converting by said conversion means in the print job, and said image forming apparatus comprising:

second storage means for storing confidential data unique to each user;

second comparison means for comparing confidential data included in the print job received from the printer server with the confidential data stored in said second storage means to determine whether the identical confidential data exists; and image forming means for forming an image only when said second comparison means determines that the identical confidential data exists.

28. An image forming system according to claim 27, wherein said print server further comprises data transfer means for transferring data to said image forming means only when said first comparison means determines that the identical identifier exists.

29. An image forming system according to claim 27, wherein said image forming apparatus further comprises counting means for counting the number of used sheets for each confidential data and third storage means for storing the number of used sheets counted by said counting means and said counting means counts the number of output sheets in the printing job when said second comparison means determines that the identical confidential data exists.

30. An image forming system according to claim 27, wherein the confidential data is confidential code number data.

31. A storage medium for storing a program which can be read by a computer, said program controlling a print server having management means for managing identification data for identifying each user, comprising:

a determination step for determining whether said management means manages the identification data included in a print job sent from a client for identifying the client; and an embedding step for embedding confidential data required to use an image output apparatus in the print job when it is determined in said determination step that the management means manages the identification data included in the print job.

32. A storage medium for storing a program which can be read by a computer, said program controlling an image forming apparatus for controlling an image output according to a print job sent from a client, in which a print server embeds confidential data, comprising:

a determination step for determining whether the print job received from the print server includes confidential data;

an image forming step for controlling image formation according to the print job when it is determined in said determination step that confidential data is embedded in the print job;

a counting step for counting the number of discharged sheets correspondingly to the confidential data when a recording medium in which an image is formed and recorded is successfully discharged; and an output step for outputting the count information corresponding to the confidential data, counted in said counting step to the print server.

\* \* \* \* \*